United States Patent
Gray, Jr.

(10) Patent No.: US 7,121,304 B2
(45) Date of Patent: Oct. 17, 2006

(54) LOW PERMEATION HYDRAULIC ACCUMULATOR

(75) Inventor: Charles L. Gray, Jr., Pinckney, MI (US)

(73) Assignee: The United States of America as represented by the Administrator of the U.S. Environmental Protection Agency, Washington, DC (US)

( * ) Notice: Subject to any disclaimer, the term of this patent is extended or adjusted under 35 U.S.C. 154(b) by 0 days.

(21) Appl. No.: 10/021,443

(22) Filed: Dec. 19, 2001

(65) Prior Publication Data

US 2003/0111124 A1    Jun. 19, 2003

(51) Int. Cl.
F16L 55/04    (2006.01)

(52) U.S. Cl. .......................................... 138/30; 138/26

(58) Field of Classification Search .................. 138/30, 138/26, 27, 31, 32
See application file for complete search history.

(56) References Cited

U.S. PATENT DOCUMENTS

| | | | | | |
|---|---|---|---|---|---|
| 2,016,247 | A | * | 10/1935 | Simmons ................... | 174/12 R |
| 2,546,648 | A | * | 3/1951 | Mercier et al. ............... | 138/30 |
| 3,066,700 | A | * | 12/1962 | Mercier ...................... | 138/30 |
| 3,082,793 | A | * | 3/1963 | Sugimura .................... | 138/30 |
| 3,230,975 | A | * | 1/1966 | Mercier ...................... | 138/30 |
| 3,339,803 | A | * | 9/1967 | Wayne et al. ................. | 222/95 |
| 3,456,673 | A | * | 7/1969 | Legrand ...................... | 138/30 |
| 3,526,580 | A | * | 9/1970 | Taylor et al. ................. | 205/50 |
| 3,807,901 | A | * | 4/1974 | Wilson ....................... | 417/40 |
| 3,945,539 | A | * | 3/1976 | Sossong ................... | 222/386.5 |
| 4,032,265 | A | * | 6/1977 | Miller ........................ | 138/30 |
| 4,064,911 | A | * | 12/1977 | Albrecht ..................... | 138/30 |
| 4,080,996 | A | * | 3/1978 | Zahid ......................... | 138/30 |
| 4,213,545 | A | * | 7/1980 | Thompson et al. ........... | 138/30 |
| 4,338,968 | A | * | 7/1982 | Mercier ...................... | 138/30 |
| 4,367,786 | A | * | 1/1983 | Hafner et al. ................. | 165/10 |
| 4,526,205 | A | * | 7/1985 | Sugimura et al. ............. | 138/30 |
| 4,527,580 | A | * | 7/1985 | Chheda ....................... | 138/30 |
| 4,696,684 | A | * | 9/1987 | Shen .......................... | 92/266 |
| 4,819,697 | A | * | 4/1989 | Randa et al. ................. | 138/30 |
| 5,054,373 | A | * | 10/1991 | Brault et al. .................. | 92/92 |
| 5,117,873 | A | * | 6/1992 | Miyakawa et al. ........... | 138/30 |
| 5,133,387 | A | * | 7/1992 | Pietrykowski et al. ........ | 138/30 |
| 5,246,761 | A | * | 9/1993 | Sasaki ........................ | 428/156 |
| 5,400,602 | A | * | 3/1995 | Chang et al. ................ | 62/50.7 |
| 6,012,491 | A | * | 1/2000 | Mohr et al. .................. | 138/30 |
| 6,016,841 | A | * | 1/2000 | Larsen ........................ | 138/30 |
| 6,189,572 | B1 | * | 2/2001 | Ruffer et al. ................. | 138/30 |
| 6,286,552 | B1 | * | 9/2001 | Shimbori et al. ............. | 138/31 |
| 6,478,051 | B1 | * | 11/2002 | Drumm et al. .............. | 138/30 |
| 6,527,012 | B1 | * | 3/2003 | Weber ........................ | 138/31 |
| 6,619,325 | B1 | * | 9/2003 | Gray, Jr. ..................... | 138/30 |
| 2003/0102041 | A1 | * | 6/2003 | Gray, Jr. ..................... | 138/30 |
| 2004/0250866 | A1 | * | 12/2004 | Bartsch et al. ............... | 138/30 |

* cited by examiner

*Primary Examiner*—James Hook
(74) *Attorney, Agent, or Firm*—Bacon & Thomas, PLLC

(57) ABSTRACT

A hydraulic accumulator includes a rigid tank containing a flexible but non-elastic bladder formed of a metal foil and separating the interior of the tank into a gas space and a liquid space. The gas and liquid spaces respectively communicate with exterior sources of gas and liquid through fixtures provided on the accumulator tank. One of the fixtures is provided with an anti-extrusion valve to prevent the bladder from being forced out through the fixture. In one preferred embodiment the bladder is a bellows. In another preferred embodiment the accumulator tank is provided with a vent in communication with the liquid space within the tank to allow for venting of any gas separating from the liquid and accumulating within the liquid space.

19 Claims, 5 Drawing Sheets

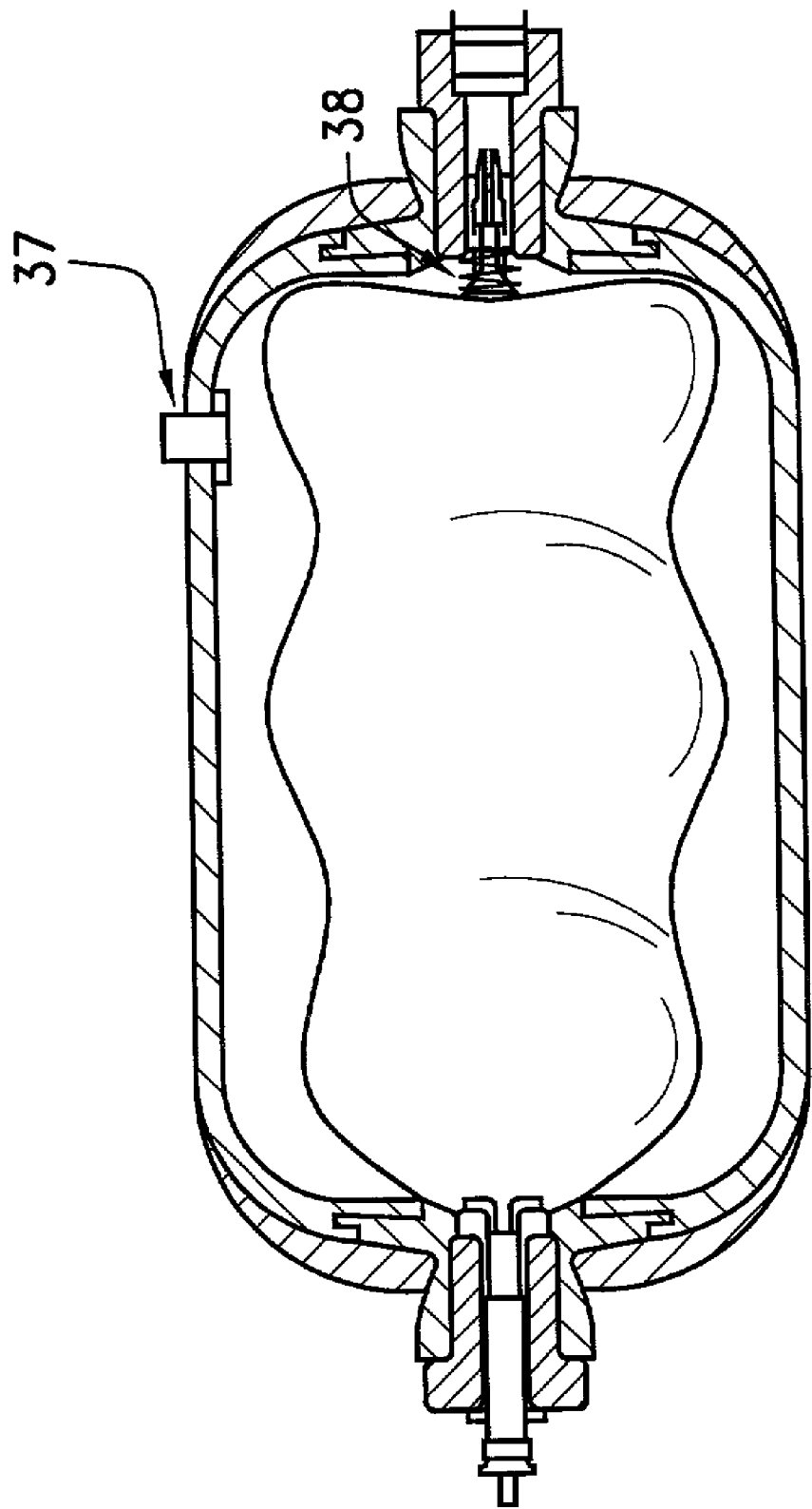

LOW PERMEATION HYDRAULIC ACCUMULATOR

BACKGROUND OF THE INVENTION

1. Field of the Invention

The present invention relates to hydraulic accumulators in general and, in particular, hydraulic accumulators for use in hydraulic drive trains of hybrid motor vehicles.

2. The Prior Art

Hydraulic hybrid vehicles utilize accumulators to store mechanical energy, either energy recovered from braking the vehicle or excess energy generated by the engine. See U.S. Pat. No. 5,495,912 and U.S. patent application Ser. No. 09/479,844 for details of the use of accumulators in hydraulic hybrid vehicles. However, conventional hydraulic hybrid vehicles suffer from a problem with permeation of compressed gas in the accumulator (that gas permanently "trapped" within a bladder) through the barrier (bladder) that separates the compressed gas from the working fluid liquid (i.e., "hydraulic fluid" or gas).

Conventional accumulators are made in several designs including: piston accumulators where the piston in a cylindrical accumulator vessel separates the hydraulic fluid from the gas (usually nitrogen), the latter being compressed to store energy by hydraulic fluid flowing into the vessel, bladder accumulators which use an elastic bladder to separate the hydraulic fluid from the gas, and diaphragm accumulators which use a diaphragm to separate the hydraulic fluid from the gas.

The most common accumulator design, and the preferred design for accumulators used in hydraulic hybrid vehicles, is the bladder accumulator. FIG. 1 shows a cross-section of a conventional bladder accumulator. An elastic bladder 11 contains compressed gas. Gas is charged through bladder fixture 12. Hydraulic fluid (liquid) is contained in space 13 and enters and exits through fixture 14. Anti-extrusion valve 15 prevents the bladder from being extruded as the liquid volume approaches zero. The bladders used in these accumulators are made of an elastomer (such as nitrile rubber). Although the pressure in the hydraulic fluid on one side of the bladder is the same as the pressure of the compressed gas on the other side of the bladder (during normal operation), molecules of the compressed gas permeate through the bladder and dissolve in the hydraulic fluid trying to reach an equilibrium concentration. The high pressures utilized in the high pressure accumulator facilitate a rather high equilibrium quantity of dissolved gas. When the hydraulic fluid is discharged to drive a hydraulic motor, the liquid pressure drops as the hydraulic fluid flows through the motor producing mechanical power. The pressure drop (for example, from 5000 psi to 100 psi) results in a low pressure liquid being discharged from the motor and then being routed to the low pressure accumulator for storage until needed during regenerative braking or during engine operation, where the engine pump receives liquid from the low pressure accumulator and discharges high pressure liquid to a hydraulic motor and/or to the high pressure accumulator for storage until again needed. The low pressure liquid leaving the hydraulic motor has (i.e., can contain) a much lower equilibrium quantity of dissolved gas, so a significant quantity of dissolved gas is expelled and the low pressure liquid and small bubbles of gas flow to the low pressure accumulator (or the engine driven pump if operating). In the low pressure accumulator the gas bubbles rise to the top of the liquid level and a pocket of gas forms. This separate gas volume causes several problems, including: (1) the separate gas volume on the liquid side of the bladder in the low pressure accumulator displaces liquid and reduces the effective capacity of the accumulator system and (2) entrained gas which is discharged with liquid when needed by the hydraulic pump causes the pump to experience cavitation and erratic torque fluctuations which are unacceptable.

The elastic bladder material can be chosen to minimize permeation, but the nature of an elastomer is such that permeation cannot be eliminated or even minimized sufficiently to be acceptable for the preferred closed system in a hydraulic hybrid vehicle. Permeation resistant, flexible coatings such as polyvinyl alcohol can be used on the gas side of the bladder, but even with such coatings the permeation level is still unacceptable.

Accordingly, it is an object of the present invention to substantially eliminate permeation of gas into the hydraulic fluid in a hydraulic accumulator.

Another objective of the present invention is to provide for venting any permeated gas from the hydraulic fluid.

SUMMARY OF THE INVENTION

In order to achieve the foregoing objectives, the present invention provides a hydraulic accumulator having a rigid tank (housing) defining an open interior with first and second fixtures on the tank for fluid communication, respectively, with gas and liquid sources exterior to the accumulator. The open interior of the tank contains a flexible, non-elastic bladder, separating the interior of the tank into a gas space and a working fluid space which, in turn, respectively communicate with the first and second fixtures. A shut-off valve is mounted in one of the fixtures and serves to shut that fixture responsive to contact with the bladder when the volume of the working fluid reaches a predetermined low value, e.g., near zero.

In the preferred embodiments the bladder is formed of a metal foil. The metal foil bladder may be coated on one or both surfaces with a protective film of a thermoplastic or elastomer.

In a preferred embodiment the hydraulic accumulator is provided with a vent and serves as a low pressure accumulator within a vehicular hydraulic drive system.

In one preferred embodiment, the bladder is in the form of a bellows (accordion shaped).

In the preferred embodiments the working fluid is a liquid and enters and exits the working fluid space within the tank which surrounds the bladder.

The present invention provides an extremely low (approaching zero) permeation bladder/accumulator system. The unique bladders minimize gas permeation to near zero. However, where the working fluid is a liquid, realizing that some gas may transfer to the liquid over a period of several years (required for vehicle use), through slow diffusion, through seams where bonding is required in the fabrication of the bladder and through the sealing around bladder fixtures such as the gas charge stem, the invention preferably further provides a gas vent assembly in communication with the working fluid space and positioned at the high point in the low pressure accumulator to sense the presence of a gas volume and vent as necessary to prevent gas accumulation (volume growth).

Realizing that prior art elastic bladders allow unacceptably high levels of permeation, the present invention utilizes an essentially non-elastic bladder structure. For a preferred embodiment, the bladder is formed to fully fill (or even slightly exceed) the interior of the accumulator at maximum pressure so that no elastic property is necessary. The invention provides unique structure to allow the bladder to deform around the anti-extrusion valve, while preventing it from depressing the valve causing unwanted early shut-off and preventing damage to the bladder by the valve, such as a retention spring or guard spring as will be described in detail later.

An alternative embodiment does not require an "oversize" bladder but, rather, provides an appropriate minimum volume of hydraulic fluid in the accumulator to prevent rupturing the bladder.

The non-permeable, non-elastic bladder, is preferably a metal foil such as aluminum, steel or copper, optionally laminated between flexible polymers or other protective material, e.g., thermoplastics and elastomers. Appropriate metal foils will provide near-zero gas permeation. A suitable metal foil is typically between 0.0003 and 0.0007 inches thick, since there is a trade-off between porosity at the lower (thinnest) limit and crack-resistance at the higher (thickest) limit. Because of the very thin thickness of the foil, appropriate polymer layers are used in preferred embodiments of the invention to protect the foil, to aid in bonding and forming the bladder, and to protect against tight folding or bending of the foil which would likely otherwise result in cracks or tears in the foil. Non-elastic, crystalline polymers may also be used in place of or in conjunction with the metal foil. Of course, if the bladder is constructed without a metal foil, the polymer itself or, if layered, the polymer or at least one layer, must be gas impermeable.

In another preferred embodiment the interior volume of the bladder is completely filled with a flexible open-cell foam, such as polyurethane. With foam filling, the ability of the bladder to sustain tight bends or folds during the compression of the gas within the bladder, as hydraulic fluid is pumped into the accumulator, is eliminated.

In another preferred embodiment the bladder is formed of a metal foil sufficiently thick, generally between 0.002 and 0.010 inches, that the metal itself resists tight bending and is sufficiently durable. For this thicker metal foil to be used in an accumulator and for the volume it contains to cycle by a factor of three or more, the metal must be formed into the structure of a bellows (accordion). While thick-wall bellows with end structures 0.25 inches (or more) thick for high pressure (e.g., 5000 psi) application have been used in speciality applications such as military aircraft accumulators, they have been structured to contain the hydraulic fluid in their interior. However, the present invention additionally employs a shut-off valve which allows the bellows to be made with a significantly thinner metal foil without fear of rupturing the bellows at the fixture upon emptying the bladder and, in the preferred embodiments, has a liquid working fluid the space within the tank surrounding the bellows which contains a static amount of a compressed gas. Alternatively, the liquid working fluid may communicate with the interior of the bellows, which then becomes the working fluid space (here "liquid space"), with the static amount of compressible gas located within the tank space surrounding the bellows. In operation of the prior art accumulator bellows, which are liquid filled, as the liquid is fully discharged and the bellows reduces to its minimum volume, the pre-charge gas pressure on the exterior of the bellows will not collapse the bellows even though the liquid side pressure has dropped and the pressure across the bellows reaches its maximum (e.g., 2000 psi). At the minimum bellows volume the exteriors of the ribs of the bellows are touching and the walls between the small diameter ribs and the larger diameter ribs are essentially touching as well, as can be seen in FIG. 4B. As the liquid pressure drops below gas pre-charge pressure, the gas pressure acts on the walls which rest against one another, and with sufficiently thick walls, the inwardly radial gas forces are reacted as well. The ends of the prior art bellows must be spherical in shape and sufficiently thick (e.g., 0.25 inches or more) to react (resist) the inwardly axial gas forces.

In an alternative embodiment, the above-mentioned bellows is formed of non-elastic non-gas-permeable plastic sheet.

As noted above, in the preferred bellows embodiment of the present invention, the interior of the bellows is filled with gas. This configuration allows the bellows end opposite the end with the gas charge fixture to cooperate with the shut-off valve as described in U.S. patent application Ser. No. 10/000,022 entitled "Hydraulic Hybrid Accumulator Shut-off Valve," the teachings of which are incorporated herein by reference. With gas inside the bellows, some minimum amount of liquid must be pre-charged around the bellows to just begin to cause it to reduce in size. After the liquid pre-charge, the gas pre-charge is added, and as gas is added the pressure equalizes across the walls of the bellows. By utilizing a liquid pre-charge before the gas side pre-charge and by utilizing the positive seal feature of the shut-off valve described in U.S. patent application Ser. No. 10/000,022, there is never a significant pressure difference across the walls of the bellows and very thin walls (for a bellows) may be utilized. Once pre-charged with gas, sufficient liquid must remain in the accumulator to avoid a pressure drop across the walls of the bellows.

The unique bladders minimize gas permeation to near zero by the use of non-elastic (non-stretchable), gas impermeable bladder construction, unlike the elastic bladders of prior art systems.

Since the bladders are non-elastic, they are provided with unique spring means of deforming around the anti-extrusion valve, either internally on externally. The internal spring means is attached to the anti-extrusion valve end of the bladder and can be a metallic spring or elastic (e.g., rubber) material. The external spring means are spring guards that surround the anti-extrusion valve, initially depressing the bladder until the working fluid volume falls to the predetermined low value, e.g., near zero, when the bladder will depress the spring guard and then the anti-extrusion (shut-off) valve.

BRIEF DESCRIPTION OF THE DRAWINGS

FIG. 3 is a schematic view, in cross-section, of another preferred embodiment of the accumulator of the present invention;

DESCRIPTION OF THE PREFERRED EMBODIMENTS

Figure 1:
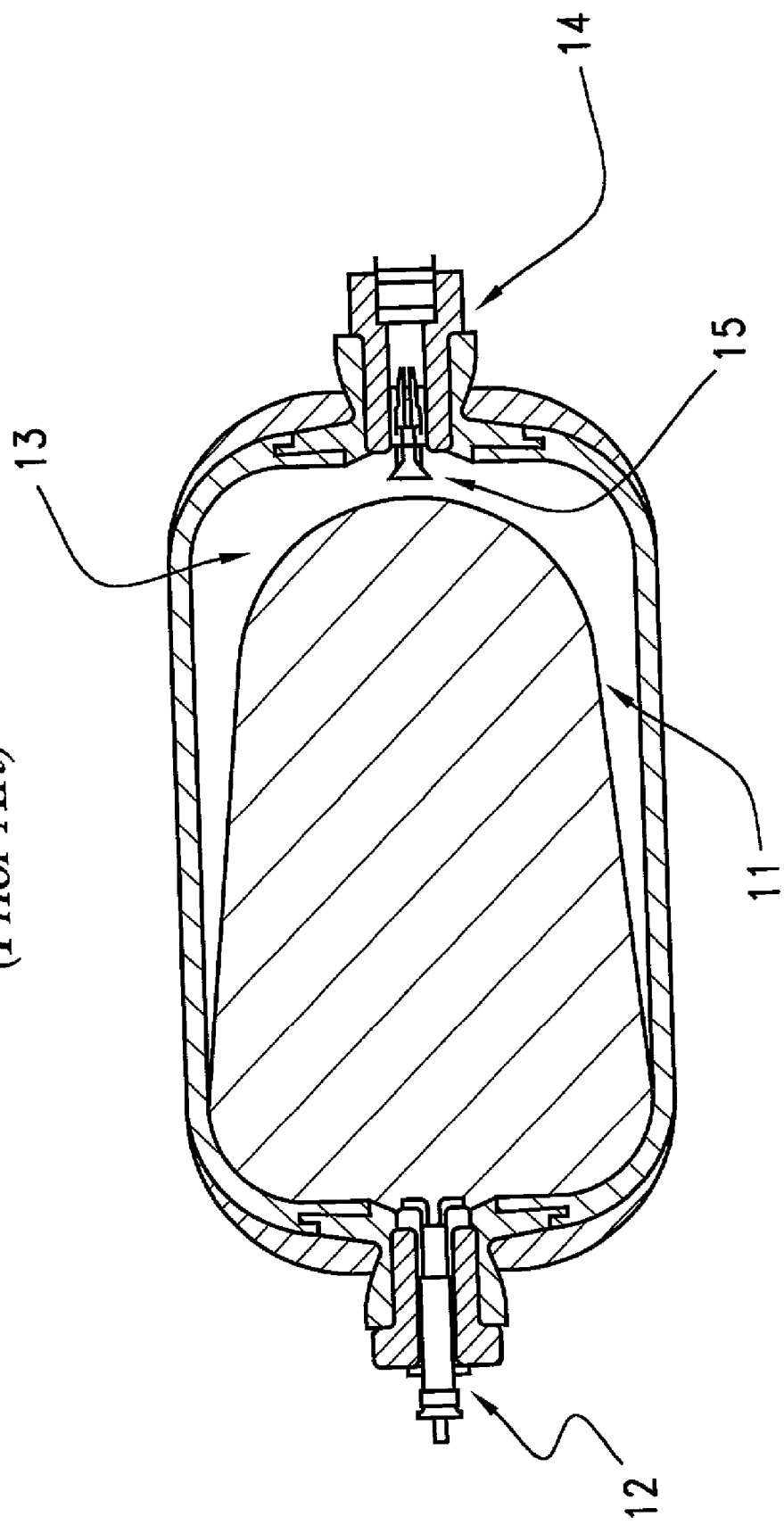
FIG. 1 is a schematic view, in cross-section, of a conventional accumulator.
Figure 2:
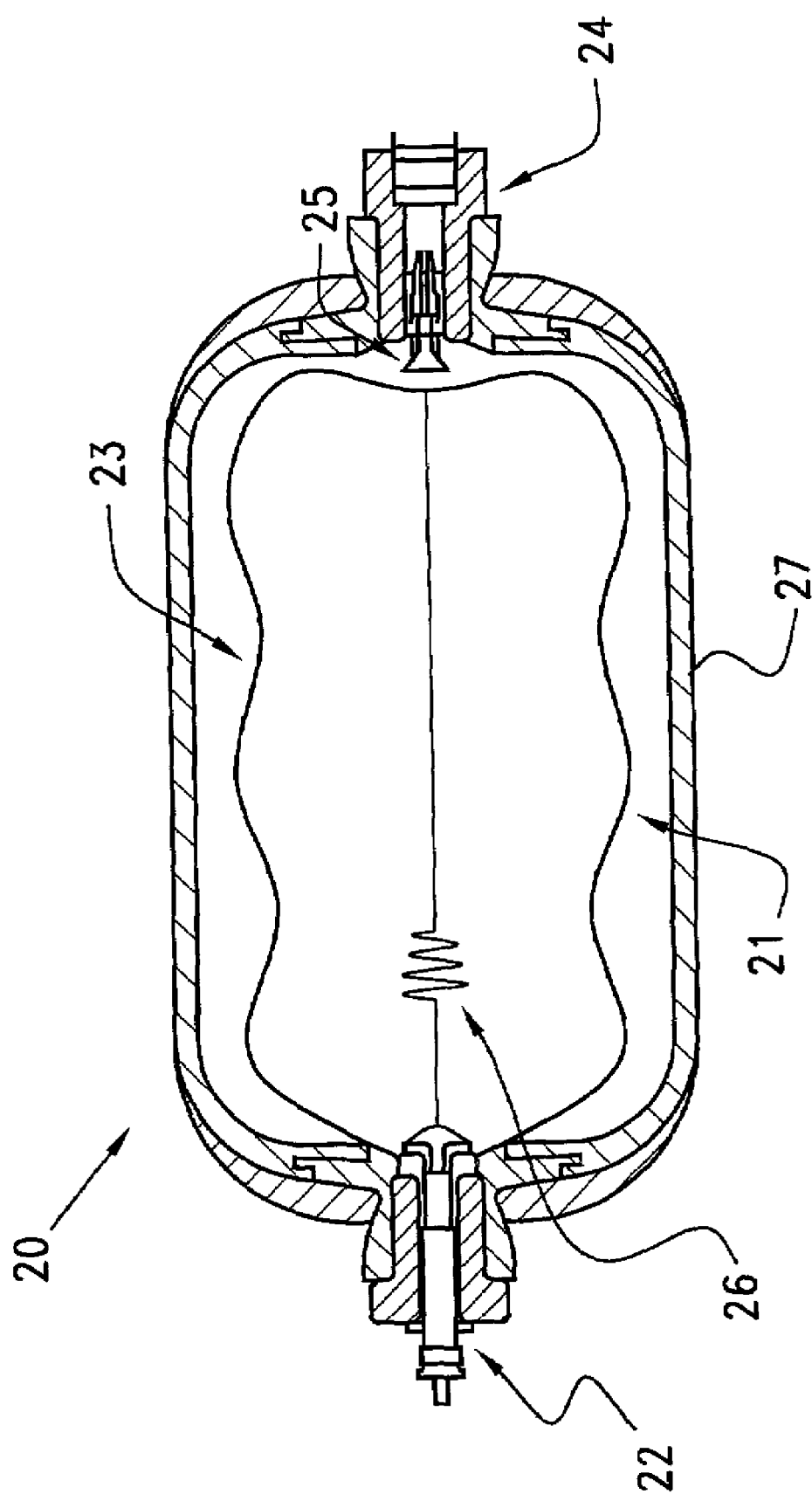
FIG. 2 is a schematic view, in cross-section, of a preferred embodiment of an accumulator according to the present invention.

FIG. 2 shows a cross-section of a preferred embodiment of the high pressure accumulator 20 of the present invention. A non-elastic, non-gas-permeable bladder 21 contains the compressed gas. Gas is charged into bladder 21 through bladder fixture 22 as in the prior art. Hydraulic fluid is contained in space 23, between rigid housing 27 and bladder 21, and enters and exits in the conventional manner through fixture 24. An anti-extrusion valve 25 prevents the bladder 21 from being extruded through fixture 24 as the liquid volume approaches zero. Retention spring 26 deforms the bladder 21 to provide a space (clearance) around anti-extrusion valve 25. As liquid is discharged, spring 26 prevents the bladder from contacting the anti-extrusion valve 25 until the liquid volume approaches zero. The anti-extrusion valve 25 is contacted as spring 26 expands when the liquid volume approaches zero to shut-off valve 25 to prevent extrusion of bladder 21. The interior volume of bladder 21 contains a complete filling of flexible (elastomeric), open-cell foam to minimize sharp bends in bladder 21.

FIG. 3 shows a cross-section of a preferred embodiment of a low pressure accumulator in accordance with the present invention. The low pressure accumulator of this embodiment functions much like the high pressure accumulator previously described. The low pressure accumulator of FIG. 3 however has a gas vent assembly 37 positioned at the high point in the low pressure accumulator to sense the presence of a gas volume and vent as necessary to prevent gas volume growth. The low pressure accumulator of FIG. 3 also contains an alternative means of deforming the bladder around the anti-extrusion valve. An external-to-the-bladder guard spring 38 performs the same function as the internal-to-the-bladder spring 26 of FIG. 2.

Figure 4A:
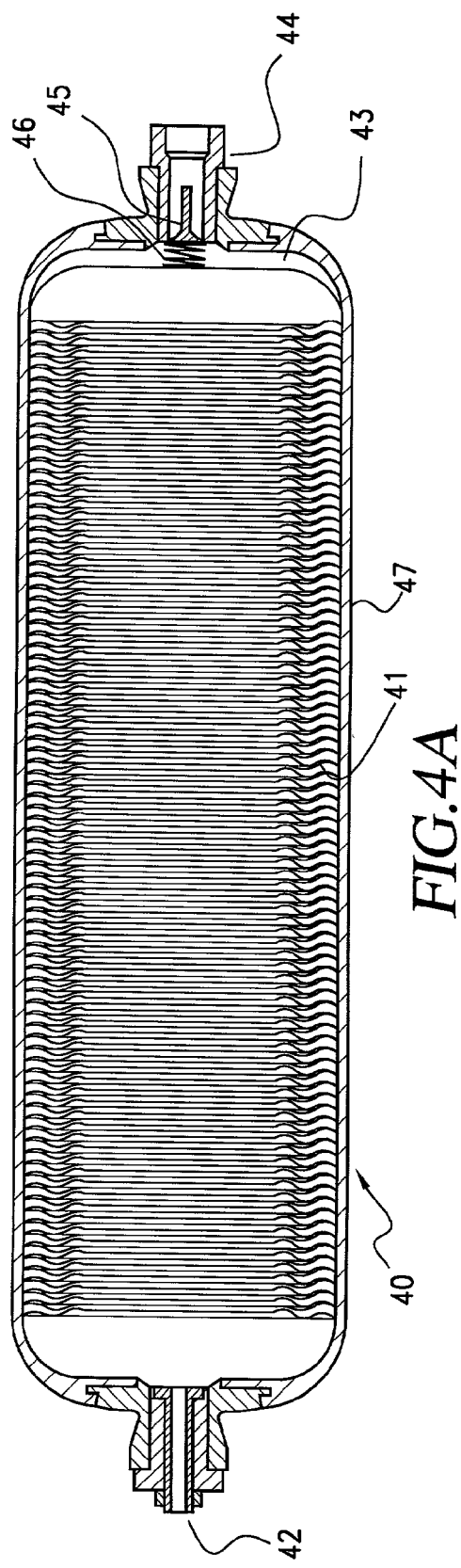
FIGS. 4A and 4B are cross-sectional views of yet another embodiment of the present invention wherein the bladder is in the shape of a bellows.
Figure 4B:
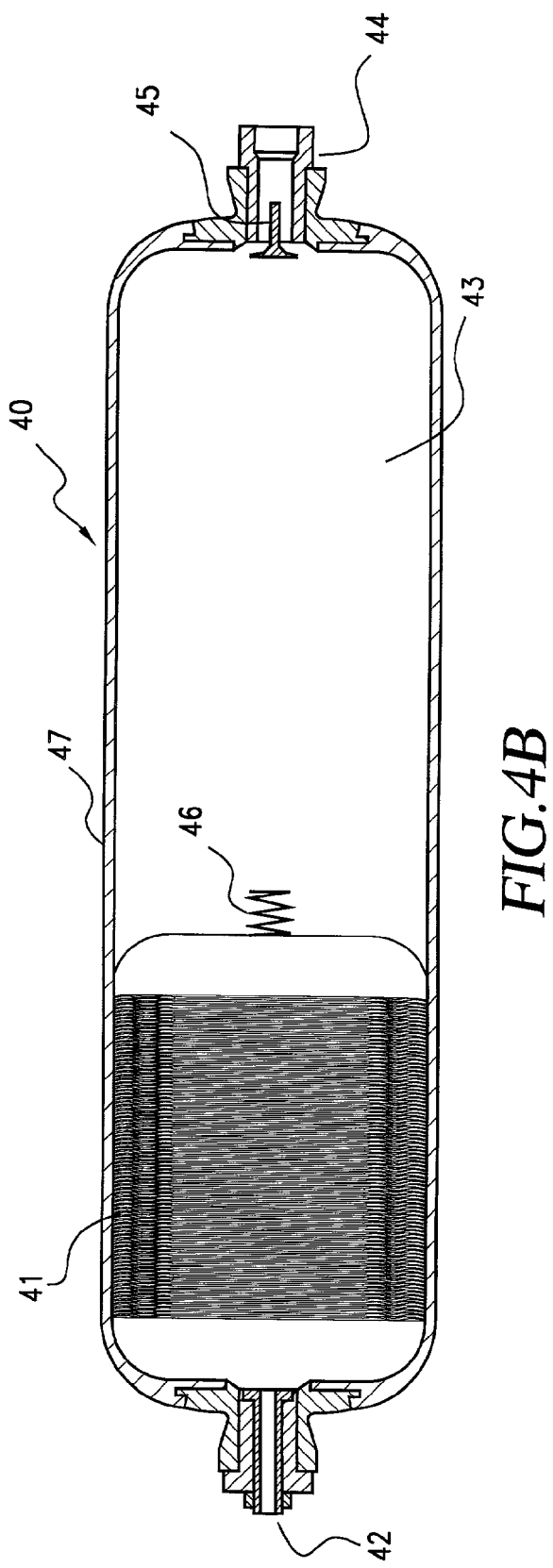

Another alternative embodiment of the present invention is shown in FIGS. 4A and 4B. FIG. 4A is a cross-section of the high pressure accumulator 40 of this embodiment in the minimum liquid content (and lowest pressure level) state, and FIG. 4B shows the state with the maximum liquid content (and maximum pressure). Bellows 41, containing a compressed gas, is contained within a rigid housing 47. Gas is charged through bellows fixture 42 as in prior art. Hydraulic fluid is contained in space 43, between bladder 41 and housing 47, and enters and exits in the conventional way through fixture 44. An anti-extrusion valve 45 prevents the bellows 41 from fully exhausting the hydraulic fluid in space 43, as shown in FIG. 4A. Shut-off spring 46 first impacts the anti-extrusion valve 45 to provide for soft closing and opening of valve 45.

Figure 5:
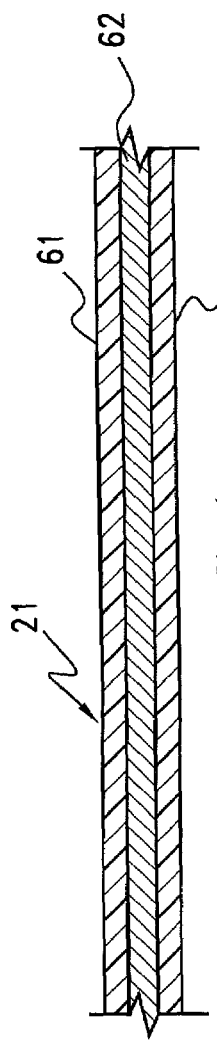
FIG. 5 is a cross-sectional view of a wall of a bladder according to a preferred embodiment of the present invention.
Figure 6:
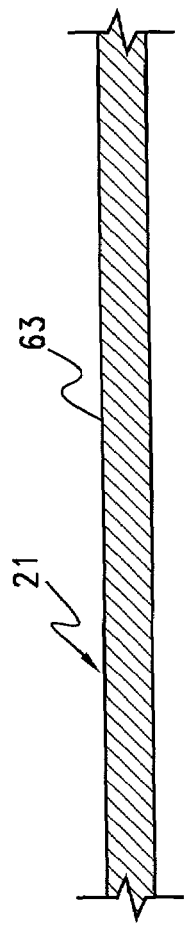
FIG. 6 is a cross-sectional view of a bladder wall in accordance with another embodiment of the present invention.
Figure 7:
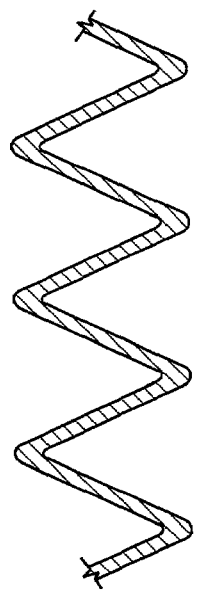
FIG. 7 is a cross-sectional view of a wall of a bladder in accordance with yet another embodiment of the invention.

FIGS. 5 and 6 show wall structures of the non-elastic bladder used in the embodiments of FIGS. 2 and 3 and FIG. 7 shows wall structure of the non-elastic bladder of the embodiments of FIGS. 4A and 4B.

Referring to FIG. 5, the wall structure of the bladder 21 is shown in the form of a metal foil 62, which may be steel or aluminum, coated on both surfaces with a thermoplastic or an elastomer 61. The only requirement for coatings 61 is that the polymeric material be flexible to allow for inflation and deflation of the bladder. Polymers suitable for forming coatings 61 include thermoplastics such as polyethylene and polypropylene and elastomers such as nitrile rubbers (co-polymers of butadiene and acrylonitrile), copolymers of butadiene and styrene, etc. As noted above, a suitable thickness for metal foil 62 is 0.0003 and 0.0007 inches.

FIG. 7 shows the wall structure of the preferred embodiment wherein the bladder 21 is in the form of a bellows or accordion shape. The thickness of the metal foil (or non-permeable polymer) for the bellows form bladder will typically be somewhat greater than that of the other embodiments, i.e., on the order of 0.002 inches to 0.010 inches.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A hydraulic accumulator comprising:
   a rigid tank having an open interior;
   first and second fixtures on said tank for fluid communication with gas and liquid sources exterior to said tank;
   a flexible bladder, mounted within said tank and having an interior in communication with one of said fixtures, said bladder separating the open interior of the tank into a gas space and a working fluid space respectively communicating through said fixtures;
   a shut-off valve mounted in a second of said fixtures and movable from an open position to a closed position closing said second fixture, responsive to coming into contact with said bladder when the volume of the working fluid within said accumulator falls to a predetermined low value; and
   a coil spring attached to said second fixture and external to and surrounding said shut-off valve, said coil spring, upon contact with said bladder, preventing said bladder from being extruded through said shut-off valve and preventing said bladder from contacting the shut-off valve until the volume of the working fluid within said accumulator falls to said predetermined low value.

2. A hydraulic accumulator according to claim 1 wherein said gas space is defined between said tank and said bladder and contains a mass of compressed gas and wherein the working fluid is a liquid which enters and exits the interior of said bladder through said second fixture.

3. A hydraulic accumulator according to claim 1 wherein said interior of said bladder contains a mass of compressed gas, and wherein the working fluid is a liquid which enters and exits said working fluid space which is defined between said tank and said bladder.

4. A hydraulic accumulator according to claim 1 wherein said bladder is formed of a metal foil, non-elastic and in the form of a non-accordion bag.

5. A hydraulic accumulator according to claim 4 wherein said metal foil is between 0.0003 and 0.0007 inches thick.

6. A hydraulic accumulator according to claim 4 wherein said metal foil has at least one surface coated with a flexible polymer.

7. A hydraulic accumulator according to claim 1 further comprising a spring internal to the bladder and attached to opposing ends of the bladder.

8. A hydraulic accumulator according to claim 1 wherein said shut-off valve opens and closes a second of said fixtures, said second fixture providing communication between one of said sources and space within the interior of said tank surrounding said bladder.

9. A hydraulic accumulator according to claim 1 wherein said bladder has an interior filled with a flexible open-cell foam.

10. A hydraulic accumulator according to claim 1 wherein said bladder is oversized relative to said rigid tank so that, in a completely filled state, the bladder completely fills the interior of the accumulator as defined by the inner wall surfaces of said rigid tank.

11. A hydraulic accumulator according to claim 1 installed in a hydraulic drive train of a hybrid motor vehicle.

12. A hydraulic accumulator comprising:
a rigid tank having an open interior;
first and second fixtures on said tank for fluid communication with gas and liquid sources exterior to said tank;
a bladder mounted within said tank and having an interior in communication with one of said fixtures, said bladder separating the open interior of the tank into a gas space within the bladder and a liquid space surrounding the bladder, respectively communicating through said fixtures;
a shut-off valve mounted in a second of said fixtures and closing the second of said fixtures responsive to coming into contact with said bladder when the volume of the working fluid within said accumulator falls to a predetermined low value; and
a gas vent assembly formed in said tank and in communication with said liquid space for sensing a gas volume and for venting to prevent growth of the gas volume.

13. A hydraulic accumulator according to claim 12 wherein said second fixture provides communication between said liquid source and said liquid space.

14. A hydraulic accumulator according to claim 12 wherein said bladder is flexible and non-elastic.

15. A hydraulic accumulator according to claim 12 further comprising a coil spring attached to said second fixture and external to and surrounding said shut-off valve, said coil spring, upon contact with said bladder, preventing said bladder from being extruded through said shut-off valve and preventing said bladder from contacting the shut-off valve until the volume of the working fluid within said accumulator falls to said predetermined low value.

16. A hydraulic accumulator according to claim 12 wherein said bladder has an interior filled with a flexible open-cell foam.

17. A hydraulic accumulator according to claim 12 wherein said bladder is oversized relative to said rigid tank so that, in a completely filled state, the bladder completely fills the interior of the accumulator as defined by the inner wall surfaces of said rigid tank.

18. A hydraulic accumulator according to claim 12 installed in a hydraulic drive train of a hybrid motor vehicle.

19. A hydraulic accumulator according to claim 12 wherein said bladder is a non-accordion bag formed of a metal foil between 0.0003 and 0.0007 inches thick.

* * * * *